United States Patent [19]

Balin

[11] 4,005,902
[45] Feb. 1, 1977

[54] LOAD CARRYING PALLET

[76] Inventor: Chaim Balin, 7 Harel St., Ramat Chen, Israel

[22] Filed: Feb. 28, 1975

[21] Appl. No.: 554,109

[52] U.S. Cl. .............................. 297/129; 108/11; 108/50; 297/15; 297/243
[51] Int. Cl.² ................ A47C 4/00; A65D 19/00
[58] Field of Search ........... 297/129, 15, 232, 243; 108/11, 15, 50, 161

[56] References Cited

UNITED STATES PATENTS

| 266,226 | 10/1882 | Underhill et al. | 297/15 |
|---|---|---|---|
| 1,158,223 | 10/1915 | Huschle | 297/15 |
| 3,183,558 | 5/1965 | Cronin | 297/243 |
| 3,394,963 | 7/1968 | Antonioli | 297/232 |
| 3,612,603 | 10/1971 | Snyder et al. | 297/243 |

FOREIGN PATENTS OR APPLICATIONS

| 880,143 | 10/1961 | United Kingdom | 297/232 |
|---|---|---|---|
| 623,528 | 5/1948 | United Kingdom | 297/15 |

Primary Examiner—Roy D. Frazier
Assistant Examiner—Darrell Marquette
Attorney, Agent, or Firm—Toren, McGeady and Stanger

[57] ABSTRACT

A load carrying pallet is provided for use in transporting cargo in aircraft, trucks or railroad carriages, such pallet having an all round extending upstanding rim thus creating a shallow depression on one face of the pallet, this depression accommodating a number of folding seats which are hingedly attached to the pallet in such a way that they can easily be folded to be fully accommodated within the depression, the rear side of the seat and/or other members being flush with the upper edge of the rim surrounding the pallet.

5 Claims, 2 Drawing Figures

LOAD CARRYING PALLET

BACKGROUND OF INVENTION

The present invention relates to certain arrangements for loading cargo. While the invention is mainly applicable to freight or cargo conveyed by aircraft, it will find use also in connection with cargo freighted by railroad or trucks.

It has become common practice to load freight into a conveying vehicle, the goods packed in a number of identical or nearly identical packages such as boxes, cartons or crates, these latter being arranged to form a four sided prism, positioned on a pallet. The pallet with its cargo thereon is conveyed by means of fork lifts or other arrangements into the freight compartment of the conveying vehicle, be it an aircraft, a railway carriage or a truck.

Especially in the case of aircraft being used as the conveying vehicle, it has been found that in many cases at its return trip, the vehicle remains empty, thus its load capacity is not fully exploited, in other words the cost of freight becomes in many cases exorbitant, or at least the operation is not as economical as it could be. For this reason it has been suggested to use so called convertible aircraft, that is to say craft wherefrom the seating arrangement, i.e. the individual seats can be removed, thus creating empty space for the introduction of cargo. However, it has been found that operating this way, namely using an aircraft alternatingly as a freight conveying vehicle and a passenger conveying vehicle, is in many cases unpractical for the reason that the mounting of seating capacity is a time-consuming operation, so that it can be put into practice only in those cases where an aircraft is being used during an extended period of time as a passenger conveying vehicle, and at other times as a freight conveying vehicle. However, the quick change from one trip to another i.e. from a trip in one direction to that in an opposite direction is not practical, for the simple reason that seating equipment is not always available at the place where the change is to be made.

OBJECTS OF THE INVENTION

It is the object of the present invention to provide means whereby the aircraft, (or whatever vehicle) can be changed almost instantaneously from a freight carrying to a passenger carrying vehicle.

According to the invention, therefore, there is used a pallet which in one condition can be used for stacking freight thereon while in an easily performed change it provides seating arrangement for passengers. Thus, a freighter which takes airfreight from one place to another, can be transformed for the return journey, or to any other destination, to serve as a passenger carrying vehicle, (or vice-versa).

SHORT SUMMARY OF THE INVENTION

According to the invention therefore, there is provided a convertible pallet which has an all round extending upstanding rim thus creating a shallow depression on one face of the pallet. This depression accommodating a number of folding seat arrangements which are hingedly attached to the pallet in such a way that they can easily be folded to be fully accommodated within the said depression; the rear side of the seat and/or other members being flush with the upper edge of the said rim surrounding the pallet.

These and further features of the invention will become clear from the following description having reference to the annexed drawings, showing by way of example one practical embodiment of the invention.

SHORT DESCRIPTION OF DRAWINGS

In the drawings FIG. 1 is a schematical, perspective view of a pallet according to the invention, while FIG. 2 is an elevational section thereof.

DESCRIPTION OF PREFERRED EMBODIMENT

The pallet comprises a plate 1 made of a material conventionally used for pallets but in contradistinction to the known arrangement the new pallet has an upstanding rim 2, the confines of which create a shallow depression. In addition to the rim extending around the pallet, there are provided ridges or ribs 3 extending along and across the depression created between the rims 2. The purpose of these ridges will become clear.

Figure 1:
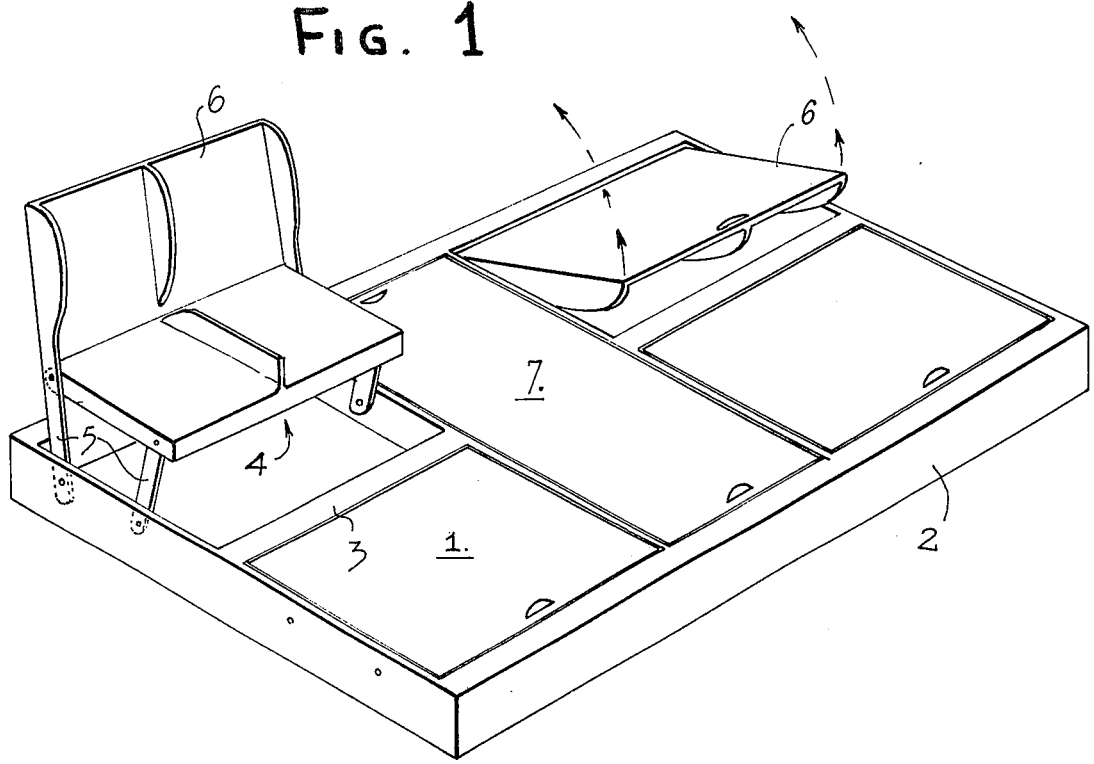
Figure 2:
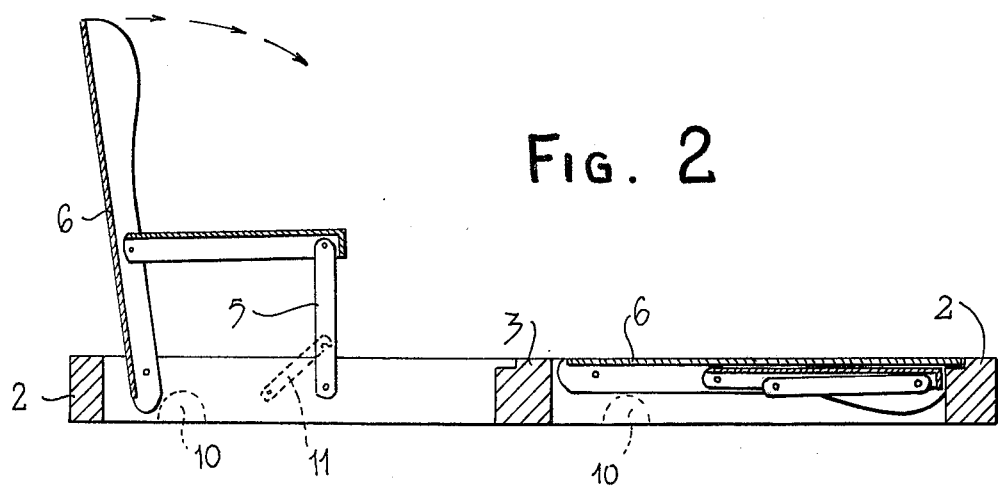

To the oppositely disposed rim portions 2 and a ridge 3 is hingedly attached a bench like seat indicated as a whole by the numeral 4. It will be seen that it has legs 5, which are hingedly attached at one side to the rim 2 and at the opposite side to a ridge 3. Abutments 10, and possibly also hinged catches 11 may be provided to stabilize the seats and prevent them from toppling over. The seat is hingedly attached to the legs. Two of these legs 5 extend upwardly and carry the back 6 of the seat. As can be seen in FIG. 2 (the right hand side) the seat can be fully folded into the depression formed within the confines of the rim 2 so that the rear side of the back 6 is flush with the upper edge of the rim members 2. This rearside is made of strong material, capable of carrying heavy loads. As can be seen in FIG. 1 between oppositely disposed seats (there are four seat benches in the arrangement of FIGS. 1 and 2) there extends an aisle which is covered by a plate member 7. When all seats are folded into the depression and the plate members 7 are placed between them, the pallet offers a plane surface onto which cargo can be stacked in a conventional manner. In this arrangement, plate 7 serves as a folding member constituting part of the floor, and need not be removed at all. The aisle space, underneath the plate 7 may serve as storage.

Obviously, it is possible to make arrangements which are different from that shown in FIGS. 1 and 2, that is to say, the seats can be differently disposed and there might be a greater or a smaller number of seats. However, in the example of FIGS. 1 and 2 an arrangement has been shown which is similar to the conventional arrangement of seats in an aircraft, that is to say rows of seats at two sides of a central aisle. Equally, the seats themselves could be built in any other conventional way. Arm rests may also be provided.

It can easily be seen that once the freight has arrived on the pallet at its point of destination, the latter can be removed from the aircraft in a customary way, the goods unloaded and the pallet can be used again, either for a new load of freight, if such is available or planned for the return trip, or by setting up the seats in the aircraft, whereupon the aircraft can convey passengers at a very much reduced rate.

Thus, the invention aims at providing means for using an aircraft both on its trip to a destination and a return trip, and having the choice of conveying either passengers or freight in one or both directions, as the freight carrying pallets and the seating facilities are always on the vehicle. Of course, it is possible to use part of the pallets with unfolded seats for accommodating passengers, and part of them with folded seats to carry freight.

What is claimed is:

1. A load-carrying pallet for use in transporting cargo in aircraft, trucks or railroad carriages, said pallet comprising a plate having an upwardly facing planar support surface onto which cargo can be stacked and an oppositely directed downwardly facing surface, a substantially rectangularly shaped upstanding closed rim extending completely around and downwardly from the peripheral edge of the planar support surface and defining the lateral exterior of said pallet, said rim having an upper edge in the plane of said planar support surface of said plate and a lower edge spaced downwardly below said upper edge and below said downwardly facing surface of said plate with said rim presenting a continuous surface between its upper and lower edges with the upper edge of said rim extending continuously around said rectangular shaped rim, said rim defining a shallow depression below the downwardly facing surface of said plate, said plate comprising upstanding ribs located within the shallow depression and extending interiorly of and across said rim with the upper edges of said ribs being flush with the upper edge of said rim, and said plate also including panels having an upper surface and a lower surface with the upper surface of said panels being flush with and disposed between the upper edges of said rim and said ribs and the lower surface being spaced downwardly from said upper surface, hinge means connecting said panels to at least one of said rim and said ribs so that said panels can be displaced between a folded position with the upper surface of said panels being flush with the upper edges of said rim and ribs and an open position with said panels extending upwardly from the upper edges of said rim and ribs, seat members hinged to said panels and displaceable therewith between the folded and open positions so that in the folded position said seat members are located in said shallow depression below said panels and the surface forming the lower surface of said panels in the folded position forms the back of a seat in the open position and said seat members in the open position extend generally normal to the lower surface of said panels forming a seating surface with said seat members in the open position spaced above the upper edges of said rim and ribs.

2. A load-carrying pallet, as set forth in claim 1, wherein means are hingedly connected to at least one of said rim and said ridges for securing said seat members in the open position.

3. A load carrying pallet, as set forth in claim 2, wherein abutments are formed on at least one of said rim and said ridges for supporting said panels in the open position for stabilizing said panels and seat members and prevent them from toppling over.

4. A load carrying pallet for use in transporting cargo in aircraft, trucks or railroad carriages, said pallet comprising a closed multi-sided upstanding rim extending around and defining the lateral exterior of said pallet, said rim having an upper edge, a planar top surface for supporting heavy loads disposed flush with the upper edge of said rim and extending continuously across said multi-sided rim, said top surface comprising upstanding ridges extending interiorly of and across said rim with the upper edges of said ridges being flush with the upper edge of said rim, and said top surface also including panels having an upper surface and a lower surface with the upper surface of said panels being flush with and disposed between the upper edges of said rim and said ridges, hinge means connecting said panels to at least one of said rim and said ridges so that said panels can be displaced between a folded position with the upper surface of said panels being flush with the upper edges of said rim and ridges and an open position with the panels extending upwardly from the upper edges of said rim and ridges, seat members hinged to said panels and displaceable therewith between the folded and open positions so that in the open position the lower surface of said panels form the back of a seat and said seat members extend generally normal to the lower surface of said panels forming a seating surface with said seat members spaced above the upper edges of said rim and ridges, said multi-sided rim defining a rectangular shape, said rectangular multi-sided rim consists of a first side, a second side, a third side and a fourth side, said first side and said second side of said rim spaced apart and extending in generally parallel relation and said third side and said fourth side of said rim spaced apart and extending in generally parallel relation between the opposite ends of said first side and said second side, said panels comprising a first panel, a second panel, a third panel and a fourth panel, said first and second panels being rectangular with one edge in juxtaposition to and extending along said first side, said first panel having another edge disposed in juxtaposition to and extending along said third side of said rim, said second panel having another edge disposed in juxtaposition to and extending along said fourth side of said rim, said first and second panels each having another edge disposed in parallel relation with said one edge and spaced from said first side and said second side of said rim and said first and second panel each having an edge disposed in parallel with said another edge and spaced from said third side and said fourth side of said rim, and said edges on said first and second panels spaced in parallel with said another edge thereof being disposed in laterally spaced relation to one another, and said top surface including a removable aisle panel disposed flush with and located between the adjacent edges of said first and second panels.

5. A load-carrying pallet for use in transporting cargo in aircraft, trucks or railroad carriages, said pallet comprising a closed multi-sided upstanding rim extending around and defining the lateral exterior of said pallet, said rim having an upper edge, a planar top surface for supporting heavy loads disposed flush with the upper edge of said rim and extending continuously across said multi-sided rim, said top surface comprising upstanding ridges extending interiorly of and across said rim with the upper edges of said ridges being flush with the upper edge of said rim, and said top surface also including panels having an upper surface and a lower surface with the upper surface of said panels being flush with and disposed between the upper edges of said rim and said ridges, hinge means connecting said panels to at least one of said rim and said ridges so that said panels can be displaced between a folded position with the upper surface of said panels being flush with the upper edges of said rim and ridges and an open position with said panels extending upwardly from the upper edges of said rim and ridges, seat members hinged to said panels and displaceable therewith between the folded and open positions so that in the open position the lower surface of said panels form the back of a seat and said seat members extend generally normal to the lower surface of said panels forming a seating surface with said seat members spaced above the upper edges of said rim and ridges, means hingedly connected to at least one of said rim and said ridges for securing said seat members in the open position, abutments formed on at least one of said rim and said ridges for supporting said panels in the open position, and said top surface of said pallet comprises four said panels of rectangular shape and arranged to form seats in the open position and one said aisle panel extending across said pallet from one side to an opposite side of said rim with two of said seat panels on one side of said aisle panel and the other two of said seat panels on the other side of said aisle panel.

* * * * *

UNITED STATES PATENT OFFICE
CERTIFICATE OF CORRECTION

Patent No. 4,005,902     Dated February 1, 1977

Inventor(s) Chaim Balin

It is certified that error appears in the above-identified patent and that said Letters Patent are hereby corrected as shown below:

On the cover sheet Item (30) insert Foreign

Priority Data:

-- March 28, 1974    Israel    44520 --.

Signed and Sealed this

Seventh Day of March 1978

[SEAL]

Attest:

RUTH C. MASON
Attesting Officer

LUTRELLE F. PARKER
Acting Commissioner of Patents and Trademarks